April 21, 1959     B. F. BREGI ET AL     2,882,798
APPARATUS FOR CUTTING GEAR TOOTH SURFACES
Filed March 4, 1953     5 Sheets-Sheet 1

INVENTORS
BENJAMIN F. BREGI
BY FERDINAND J. POHLMEYER
ATTORNEYS

April 21, 1959 B. F. BREGI ET AL 2,882,798
APPARATUS FOR CUTTING GEAR TOOTH SURFACES
Filed March 4, 1953 5 Sheets-Sheet 3

INVENTORS
BENJAMIN F. BREGI
BY FERDINAND J. POHLMEYER
Whittemore, Hulbert
& Belknap ATTORNEYS INVENTORS
BENJAMIN F. BREGI
FERDINAND J. POHLMEYER
BY
*Whittemore, Hulbert*
*& Belknap*
ATTORNEYS April 21, 1959 B. F. BREGI ET AL 2,882,798
APPARATUS FOR CUTTING GEAR TOOTH SURFACES
Filed March 4, 1953 5 Sheets-Sheet 5

INVENTORS
BENJAMIN F. BREGI
BY FERDINAND J. POHLMEYER
Whittemore, Hulbert
& Belknap ATTORNEYS

United States Patent Office 2,882,798
Patented Apr. 21, 1959

2,882,798

APPARATUS FOR CUTTING GEAR TOOTH SURFACES

Benjamin F. Bregi and Ferdinand J. Pohlmeyer, Detroit, Mich., assignors to National Broach & Machine Company, Detroit, Mich., a corporation of Michigan Application March 4, 1953, Serial No. 340,294

13 Claims. (Cl. 90—1.6)

The present invention relates to apparatus for cutting gear tooth surfaces, and more particularly to method and apparatus designed to take cuts on the surfaces of gear teeth in a direction from the crests toward the roots thereof.

It is an object of the present invention to provide apparatus for cutting gear tooth surfaces in which a gear member is rolled relative to a series of cutting blades or teeth, in which the blades or teeth have cutting edges at the tops thereof and are designed and located to take cuts from the surfaces of the gear teeth during approach and from the tops toward the roots of the gear teeth.

It is a further object of the present invention to provide apparatus for cutting gear tooth surfaces comprising an annular cutter having radially inwardly directed cutting blades, a work support, means for revolving the work support about an axis concentric with the axis of the cutter, means for rotating the work support on its own axis to produce a rolling motion of a work gear carried thereby relative to the cutter.

It is a further object of the present invention to provide apparatus as described in the preceding paragraph in which the rotation of the work spindle on its own axis is controlled by a master internal gear concentric with the cutter, and a master pinion coupled to the work support spindle and concentric therewith.

Other objects and features of the invention will become apparent as the description proceeds, especially when taken in conjunction with the accompanying drawings, wherein.

Figure 1:
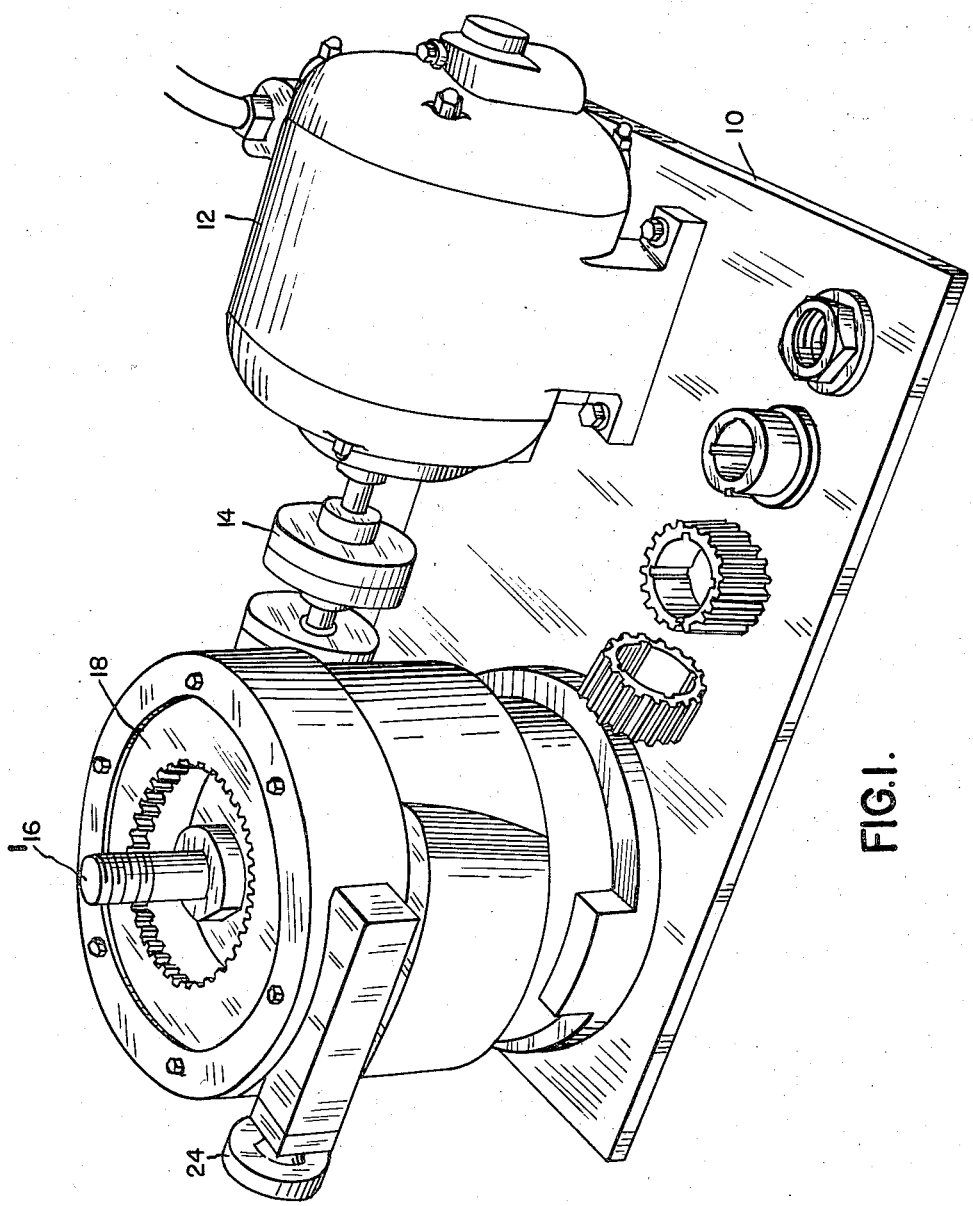
Figure 1 is a perspective view of the apparatus for cutting gear tooth surfaces viewed from one side thereof.
Figure 2:
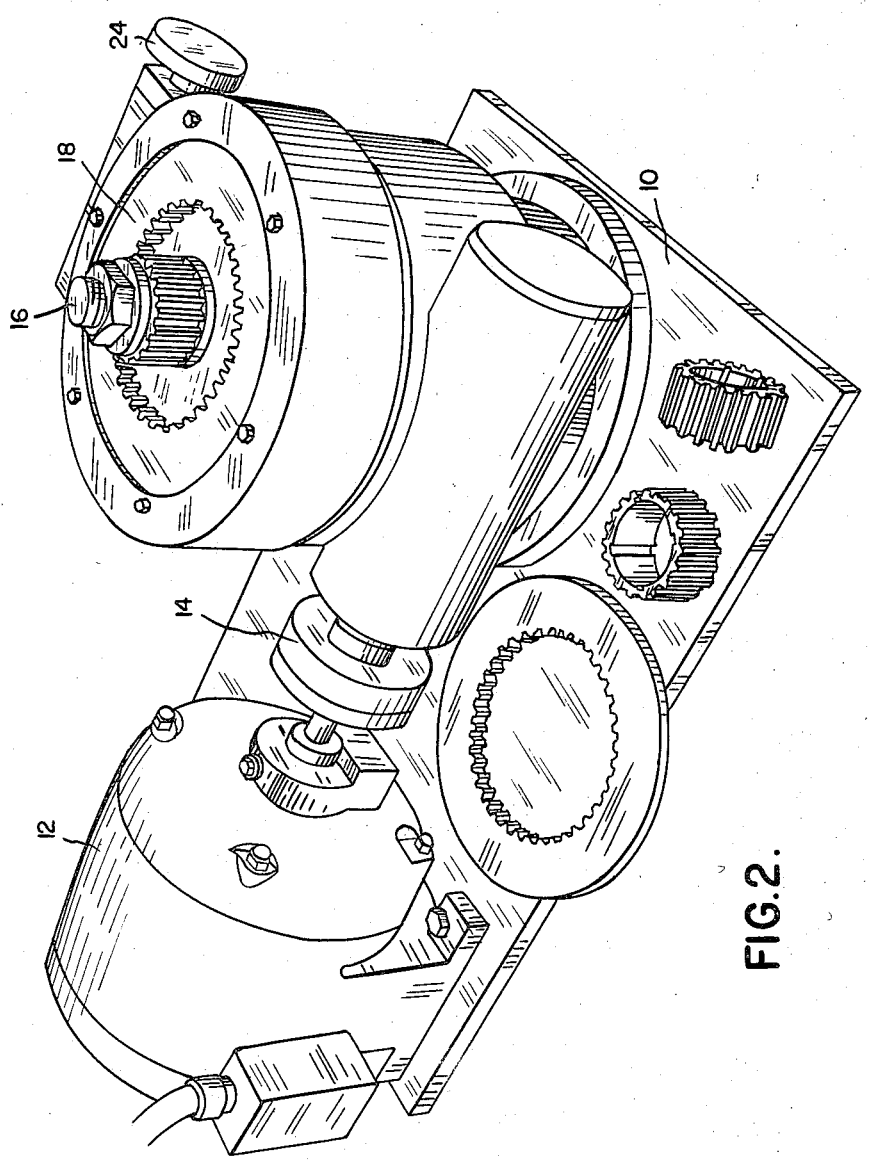
Figure 2 is a perspective view of the apparatus illustrated in Figure 1 as seen from the other side thereof with the work piece in place.

Referring first to Figures 1 and 2 the apparatus comprises a bed plate 10 on which is mounted a motor 12 having a drive shaft connected through a flexible coupling 14 to suitable drive mechanism for revolving a work supporting spindle 16 about an axis concentric with the axis of an annular cutter body 18. By mechanism which will be described in detail in conjunction with subsequent figures, the work spindle 16 is rotated about its own axis as it is revolved about the axis of the cutter body 18.

As best seen in Figure 2, a work gear may be mounted upon the work spindle 16 and due to its revolution about the axis of the cutter body and rotation about its own axis, the work gear is caused to have a rolling motion within the annular cutter body. The cutter body is provided with cutting teeth or blades which are adapted to enter the tooth spaces of the work gear.

Figure 3:
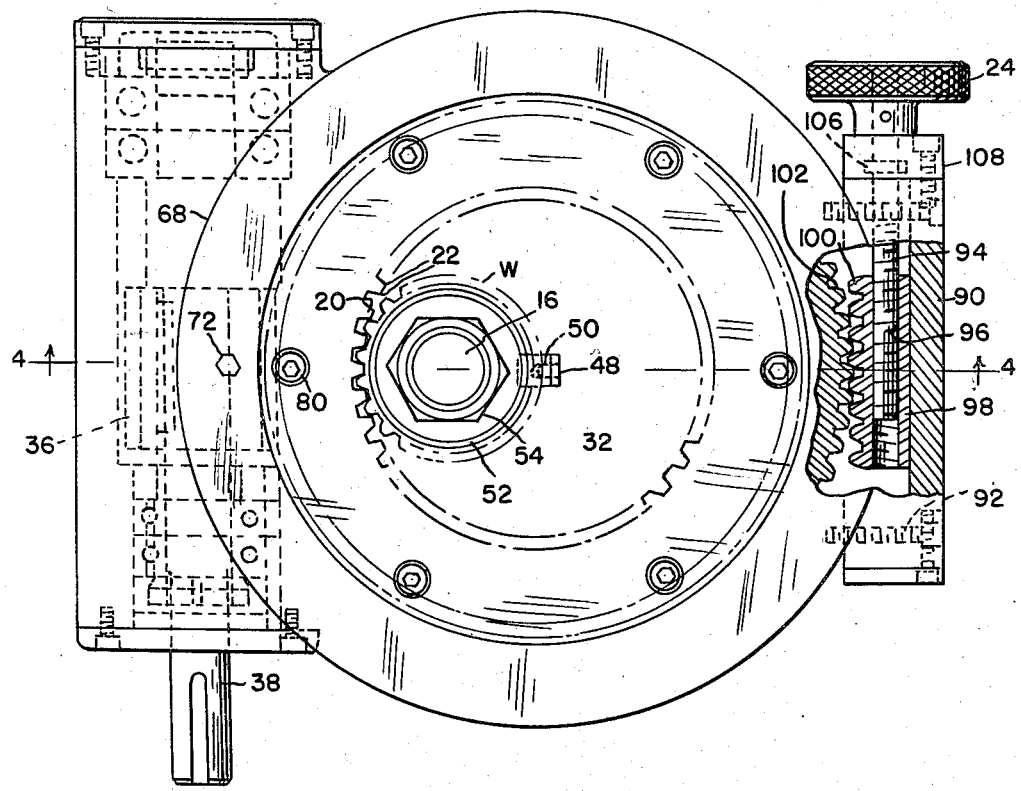
Figure 3 is a plan view of the cutting assembly with parts broken away.

As best seen in Figure 3, the blades 20 of the cutter body 18 are provided with sharp cutting corners 22 at the tops or crests thereof.

In the illustrated embodiment of the present invention means are provided for effecting angular adjustment of the cutter body and this means includes the hand wheel 24 associated with a rack and pinion subsequently to be described in detail. The motor 12 is reversible and is adapted to be driven first in one direction and then in the other direction to operate on both sides of the teeth of the work gear W.

Figure 4:
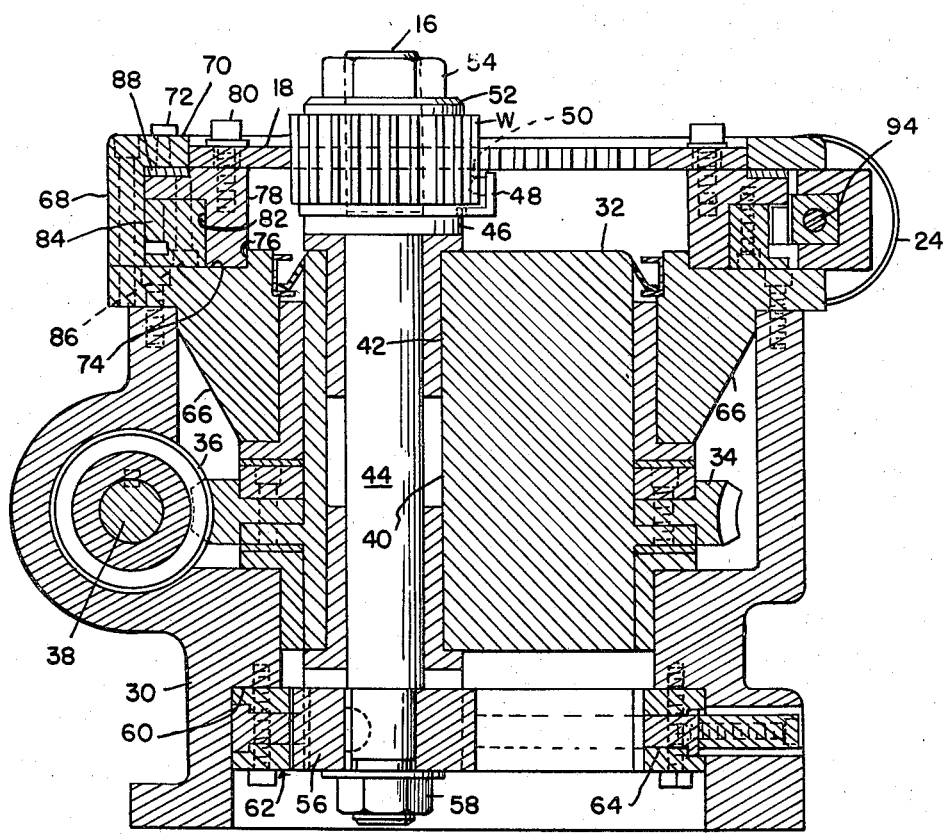
Figure 4 is a section on the line 4—4, Figure 3.

Referring now specifically to Figures 3 and 4 the cutting apparatus comprises a casting 30 within which is journalled a rotary support body 32, the body 32 having secured thereto a worm gear 34 adapted to be driven by a worm 36 keyed or otherwise secured to the output shaft 38 of the flexible coupling 14. Thus, the motor operates primarily to rotate the body 32 in either direction dependent upon the direction of rotation of the motor.

Extending through the body 32 is an opening 40 receiving bearings 42 which support the shaft 44 of the work support spindle 16. At its upper end the shaft is provided with a radially outwardly extending collar 46 and above the collar 46 there is provided a work piece locator 48 having a ball point 50 adapted to enter into the spaces between a pair of adjacent teeth of the work gear W so as to locate the work gear in predetermined position. The work gear W is clamped to the spindle 16 by suitable means such for example as the washer 52 and nut 54.

At its lower end the shaft 44 has keyed or otherwise secured thereto a master pinion 56 which as illustrated in Figure 4 is retained in position by a nut 58.

At the lower end of the casting 30 is a laterally enlarged recess 60 in which is received a master internal gear assembly 62. The master internal gear assembly 62 is composed of three sections, the intermediate section 64 of which is circumferentially adjustable with respect to the other two to take up backlash. Backlash eliminators of this type are well known and need not be described further here.

At the upper end of the casting 30 there is mounted an assembly comprising an annular member 66 to which is secured an upwardly extending retainer member 68 having a radially inwardly extending flange 70 provided with threaded openings to receive screws 72. The upper surface of the annular member 66 is provided with a machined surface 74 terminating in an outwardly facing vertical shoulder 76. An annular cutter support body 78 is provided which rests upon the surface 74 and takes its location against the surface 76. The cutter support body is adapted to support the cutter body 18, this being illustrated in Figure 4 as attached to the cutter support body 78 by screws 80. The cutter support body 78 is recessed around its outer periphery as indicated at 82 and secured within this recess is an external gear 84. The gear 84 is secured to the cutter support body 78 by screws 86 whereby the cutter 18, the cutter support body 78, and the gear 84 are rotatable as a unit relative to the annular member 66. Preferably, the cutter support body 78 bears against an annular bearing 88 and pressure is applied downwardly to the bearing 88 by the screws 72.

In order to effect circumferential adjustment of the cutter 18 during the cutting operation, the means illustrated at the right of Figures 3 and 4 is provided. An elongated housing 90 is bolted to one side of the annular member 66 by bolts indicated at 92. The hand wheel 24 is connected to a screw 94 and this screw is received within a threaded opening 96 in a rack member 98. The rack member 98 is provided with teeth 100 meshed with the teeth 102 of the gear 84. The screw 94 is provided with a radially extending collar 106 retained in a suitably formed recess in a cap 108, thereby preventing longitudinal movement of the screw. Accordingly, rotation of the screw effects movement of the rack parallel to the axis of the screw and this movement of the rack results in rotary angular or circumferential adjustment of the cutter 18.

It will be appreciated that the angular movement of the cutter is a feeding movement and controls the depth of cut which is taken on the surfaces of the gear teeth.

Figure 5:
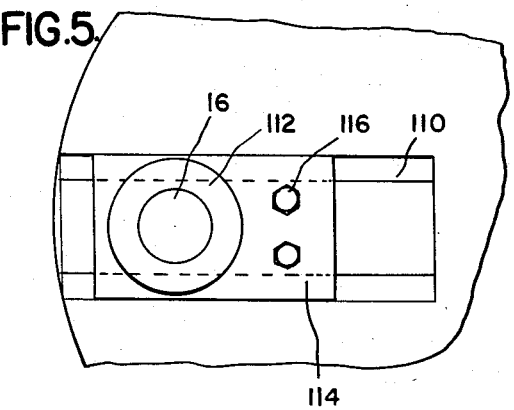
Figure 5 is a diagrammatic plan view illustrating a modification of the present invention.

In the mechanism so far described in detail it will be observed that the axis of the shaft 44 is located at a constant distance from the axis of the body 32 and that no adjustment is provided for the cutting blades 20 of the cutter. In Figure 5 there is diagrammatically illustrated an arrangement which provides for limited radial adjustment of the work support relative to the axis of the body 32. This means comprises merely radially extending ways 110 which are preferably provided at the top and bottom of the body 32, and the work support spindle 16 is journaled in bearings 112 located on a slide 114 movable longitudinally of the ways 110 and adapted to be clamped in adjusted position by T-bolts or the like indicated at 116. It will be appreciated that a similar arrangement is provided at the underside of the body 32 for supporting the lower end of the shaft 44 and hence, providing for corresponding radial adjustment of the master pinion 56.

Figure 6:
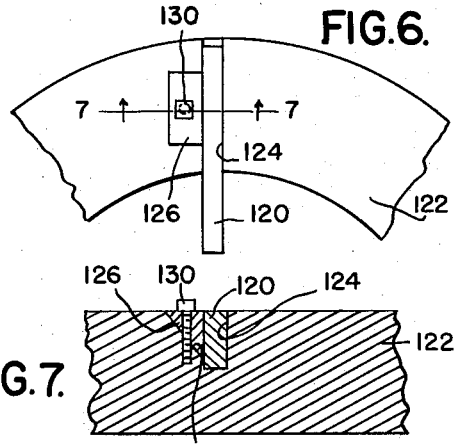
Figure 6 is a fragmentary plan view of a modified form of cutter.
Figure 7:
Figure 7 is a fragmentary section on the line 7—7, Figure 6.

Referring now to Figures 6 and 7 there is illustrated mechanism for providing radial adjustment of cutting blades designated at 120 which correspond to the blades 20 illustrated in Figure 3. In this case the cutter assembly comprises an annular body 122 having radial slots 124 therein in which the cutting blades 120 are radially adjustable. Suitable clamping means are provided for locking the blades 120 in a desired position of radial adjustment. This clamping means is illustrated as comprising a wedge block 126 engaging an inclined surface 128 which extends to the slot 124. The block 126 may be urged downwardly and hence against the side of the blade 120 by suitable means such for example as a screw 130.

The present invention is adapted to machine complete or partial tooth surfaces and to perform a variety of tooth surface finishing operations in a novel manner.

Figure 8:
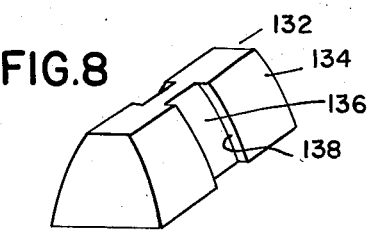
Figure 8 is a perspective view of a tooth modified in accordance with the present method.
Figure 9:
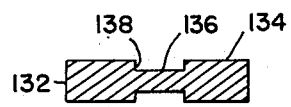
Figure 9 is a simplified longitudinal transverse section through the tooth illustrated in Figure 8.

The present method and apparatus may be employed for carrying out a variety of operations on the teeth of gears. Referring first to Figures 8 and 9 there is illustrated a gear tooth 132 having flanks or sides 134 which are preferably of substantially involute profile. Intermediate the ends of the tooth and at both sides thereof are reduced portions 136, the surfaces of which are also substantially involute in profile and which terminate in relatively abrupt shoulders 138 at each side thereof. This operation is carried out by the apparatus illustrated in the figures since it will be observed that the cutter 18 is of substantially less width than the width of the work gear W.

On the other hand, it will of course be apparent that if the cutter 18 were of equal or greater width than the width of the work gear W, the entire surfaces of the teeth of the work gear from end to end thereof would be machined by the present operation.

Figure 10:
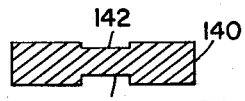
Figures 10-19 are views similar to Figure 9 illustrating the wide variety of tooth modifications which may be produced by the present method and apparatus.

In Figure 10 there is illustrated a variation of the tooth form shown in Figures 8 and 9 wherein a tooth 140 is illustrated as having relieved or reduced intermediate portions 142 and 144. In this case however, it will be observed that the relieved or reduced portion 144 is of substantially greater depth than the relieved or reduced portion 142.

Figure 11:

In Figure 11 there is illustrated a tooth 150 having a reduced or relieved portion 152 at one side thereof only, the opposite side of the tooth as indicated at 154 being unmodified.

Figure 12:
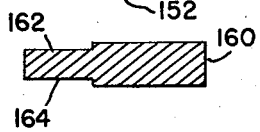

In Figure 12 there is illustrated a tooth 160 in which the relieved or reduced portions 162 and 164 are provided at one end of the tooth 160 rather than centrally of the tooth.

Figure 13:
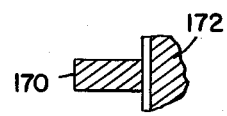

In Figure 13 there is illustrated a tooth 170 which at one end is spaced closely to a shoulder 172 so as to prevent previously known types of tooth finishing operations. The present operation permits finishing of a tooth surface up to a shoulder and thus provides for the first time a satisfactory method of finishing blind gears or shoulder gears having extremely small spacing between the ends of a smaller gear and a shoulder.

Figure 14:

In Figure 14 there is illustrated a tooth 180 the corners of which are chamfered as indicated at 182. It will be appreciated that for this operation it is necessary only to form the blades of the cutter appropriately to provide the angled chamfers 182.

Figure 15:

In Figure 15 there is illustrated a tooth 190 having the corners of the teeth at one end rounded off as indicated at 192. Obviously, this operation could be provided to round off the corners at both ends of the teeth if so desired.

Figure 16:
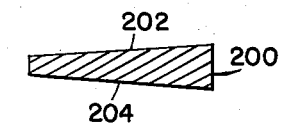

In Figure 16 there is illustrated a tooth 200 which is tapered from end to end so that the opposite sides 202 and 204 thereof converge toward one end of the tooth.

Figure 17:

In Figure 17 there is illustrated a tooth 210 which is of a "crown" form. Teeth of this type are known and are at present produced by gear shaving operations. However, there are limitations as to the amount of crown which can be applied to gear teeth by present known methods. No such limitation applies to the present method and any desired amount of crown may be effected.

Figure 18:

In Figure 18 there is illustrated a tooth 220 having grooves or serrations 222 which extend from top to bottom thereof. Teeth provided with serrations of this type are useful as gear shaving cutters when they are in mesh at crossed axes with a work gear.

Figure 19:
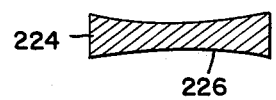

In Figure 19 there is illustrated a tooth 224, the sides of which as indicated at 226 are longitudinally concave. It will be observed that this tooth is substantially the reverse of the crowned tooth illustrated in Figure 17.

In carrying out the operation of the present machine and the practice of the present method a work gear is mounted on the spindle 16, the gear being located by entry of the rounded point 50 in a tooth space. The arrangement is such that at this time a blade in line with the axes of the body 32 and the shaft 44 extends into a tooth space of the gear and is spaced circumferentially from the two adjacent teeth of the work gear. At this time the motor 12 is started to rotate in one direction and the shaft 44 is therefore caused to revolve about the axis of the body 32. This revolution of the shaft 44 causes rotation of the master pinion 56 due to its meshed engagement with the master internal gear assembly 62. This in turn causes rotation of the work gear W and produces a rolling motion of the work gear. By appropriate design of parts the work gear may be caused to have a true rolling motion about its base circumference or adjacent thereto.

The work gear continues its rolling motion without contacting the teeth of the cutter until a feeding motion is introduced by rotation of the hand wheel 24, which effects a circumferential adjustment of the cutter until the cutting edges at the tops of the blades thereof initially engage the teeth of the work gear. Thereafter, continued rotation of the hand wheel 24 effects a machining of the gear teeth to a desired depth. It will be appreciated that this machining operation is carried out at one side only of the gear teeth and takes place during approach between the blade of the cutter and the teeth of the gear.

After one side of the gear tooth is machined to the required depth, the cutter is reversed and the hand wheel rotated in the opposite direction to feed the cutter to depth at the opposite side of the gear teeth. Accordingly, it is possible to machine either or both sides of gear teeth and to effect a different depth of machining at opposite sides of the gear teeth.

Obviously, modifications of the apparatus will be apparent. Instead of effecting angular adjustment of the cutter 18, equivalent results could be obtained by effecting a similar angular adjustment of the master internal gear assembly 62.

In like manner, rotary motion may be imparted to the work gear spindle by means other than an internal and external master gear set. Thus for example, planetary gearing may be employed to produce the required rolling motion of the work gear and this affords the possibility of introducing change gears so as to produce different rolling motions by substitution of appropriate change gears in the transmission.

It will be readily appreciated that tooth form may be modified by location of the effective rolling circumference on the work gear with reference to the base circumference of its teeth. In general, it appears desirable for the rolling circumference of the gear to be located in the vicinity of its base circumference.

With reference to form or modification produced on the teeth of the gear, it will be observed that any desired modification can be imparted to the gear teeth simply by appropriately shaping the blades of the cutter. Thus for example, in producing the chamfered gear tooth illustrated in Figure 14, blades having cutting surfaces extending at the required angle will be provided. While for simplicity the invention has been illustrated as applied to operations on spur teeth, it will of course be apparent that by appropriately shaping the blades of the cutter, corresponding results may be produced on the teeth of helical gears.

It will of course be obvious that the invention may be practiced by employing a cutter in place of the work gear W, for the purpose of finishing an internal work gear mounted in the position of the cutter body 18.

It is found that the profile or form of the tooth surface resulting from the present operation and as extending between the root and crown thereof, may be modified and controlled by varying the spacing between the centers of the work gear and cutter, and also by adjusting the cutter blades radially. Tooth surfaces have been produced which are involute within tolerances that are commercially acceptable, and others have been produced which are substantially involute but include desirable modifications thereof, such for example as tip relief.

The drawings and the foregoing specification constitute a description of the improved method and apparatus for cutting gear tooth surfaces in such full, clear, concise and exact terms as to enable any person skilled in the art to practice the invention, the scope of which is indicated by the appended claims.

What we claim as our invention is:

1. Apparatus for machining surfaces of gear teeth which comprises an annular cutter having a series of radially inwardly directed blades each of which has a pair of cutting edges at its top, a gear support for a work gear, means for effecting relative motion between said gear support and cutter around the cutter, reversible means for driving said gear support in rotation in timed relation to said relative motion, and feed means for effecting positive relative angular adjustment between said gear support and cutter circumferentially of said gear support.

2. Apparatus as defined in claim 1 in which the means for driving said gear in rotation comprises gear members rolled together as a result of the said relative motion between said gear support and cutter.

3. Apparatus as defined in claim 1 in which the relative motion between said gear support and cutter is the result of a circular orbital movement of said gear.

4. Apparatus as defined in claim 3 comprising means for effecting radial adjustment of said blades.

5. Apparatus as defined in claim 3 comprising means for adjusting the radius of orbital movement of said work support.

6. Apparatus for machining the surfaces of gear teeth which comprises a complete annular series of blades spaced to enter into all tooth spaces of a gear rolled along said series of blades, each of said blades having cutting edges at opposite sides of the tops thereof to machine either one side or the other of a tooth space entered by said blades, reversible means independent of said blades for effecting rolling of a work gear along said series of blades, and means for effecting positive relative angular feeding adjustment between said cutter and work gear in one direction circumferential of the work gear to vary the depth of cut taken by said blades on one side of the gear teeth when said gear is rolled in one direction, and for effecting positive relative angular feeding adjustment between said cutter and work gear in the opposite direction circumferential of the work gear to cause the cutter to cut the opposite sides of the gear teeth and to vary the depth of cut when the gear is rolled in the opposite direction.

7. Apparatus for machining the surfaces of gear teeth which comprises a cutter having an annular body provided with a complete annular series of blades extending radially inwardly from said body and spaced to enter into all tooth spaces of a gear rolled along said series of blades, each of said blades having cutting edges at opposite sides of the tops thereof to machine either one side or the other of a tooth space entered by said blades, reversible means independent of said blades for effecting rolling of a work gear along said series of blades, and means for effecting positive relative angular feeding adjustment between said cutter and work gear in one direction circumferential of said work gear to vary the depth of cut taken by said blades on one side of the gear teeth when said gear is rolled in one direction, and for effecting positive angular feeding adjustment between said cutter and work gear in the opposite direction circumferential of said work gear to cause the cutter to cut the opposite sides of the gear teeth and to vary the depth of cut when the gear is rolled in the opposite direction.

8. Apparatus as defined in claim 3 in which the means for driving said gear support in rotation comprises a master gear set consisting of an internal master gear concentric with said cutter and a master pinion concentric with and connected to said gear support and meshing with said master internal gear.

9. Apparatus as defined in claim 8 in which the means for effecting angular adjustment between the gear support and cutter comprises means for angularly adjusting one of said cutter and internal master gear.

10. Apparatus as defined in claim 8 in which the means for effecting angular adjustment between the gear support and cutter comprises means for angularly adjusting said cutter.

11. Apparatus as defined in claim 8 in which the means for effecting angular adjustment between the gear support and cutter comprises means for angularly adjusting said internal master gear.

12. Apparatus for machining the surfaces of gear teeth which comprises a cutter having an annular body provided with a complete annular series of blades extending radially inwardly from said body and spaced to enter into all tooth spaces of a gear rolled along said series of blades, each of said blades having cutting edges at opposite sides of the tops thereof to machine either one side or the other of a tooth space entered by said blades, reversible means independent of said blades for revolving a work gear in an orbital path concentric with said body and of such radius that said blades enter into the spaces between the teeth of the gear, a master gear set for rotating the work gear on its axis in timed relation to its revolving movement, and feeding means for effecting relative peripheral adjustment between said tool and work gear to cause said blades to cut one side of the gear teeth during rotation and revolution in one direction and to cut the other side of the gear teeth during rotation and revolution in the opposite direction.

13. Apparatus as defined in claim 12 in which said feeding means comprises means independent of the means for revolving and rotating the gear for adjusting said tool about its axis.

References Cited in the file of this patent

UNITED STATES PATENTS

| Number | Name | Date |
|---|---|---|
| 1,724,168 | Barnes | Aug. 13, 1929 |
| 1,724,169 | Barnes | Aug. 13, 1929 |
| 1,786,552 | Swain et al. | Dec. 30, 1930 |
| 2,069,324 | Miller | Feb. 2, 1937 |
| 2,257,195 | Rovick | Sept. 30, 1941 |
| 2,280,045 | Miller | Apr. 14, 1942 |
| 2,292,647 | Mentley | Aug. 11, 1942 |